(12) United States Patent
Martinez et al.

(10) Patent No.: US 9,759,627 B2
(45) Date of Patent: Sep. 12, 2017

(54) PRESSURE TRANSMITTER PANEL HAVING DRAIN/VENT VALVES ORIENTED TO FACE FORWARD

(71) Applicant: GENERAL ELECTRIC COMPANY, Schenectady, NY (US)

(72) Inventors: Mauricio Martinez, Queretaro (MX); Carlos Vazquez, Queretaro (MX); Pablo Ramirez, Queretaro (MX); Alejandro Muñoz, Queretaro (MX)

(73) Assignee: General Electric Company, Schenectady, NY (US)

( * ) Notice: Subject to any disclaimer, the term of this patent is extended or adjusted under 35 U.S.C. 154(b) by 231 days.

(21) Appl. No.: 14/576,271

(22) Filed: Dec. 19, 2014

(65) Prior Publication Data
US 2016/0178468 A1    Jun. 23, 2016

(51) Int. Cl.
*G01L 27/00* (2006.01)
*G01L 19/00* (2006.01)

(52) U.S. Cl.
CPC ........ *G01L 27/002* (2013.01); *G01L 19/0023* (2013.01)

(58) Field of Classification Search
CPC . G01L 19/0007; G01L 27/002; G01L 19/147; G01L 19/04; G01L 13/00; G01L 19/0618; G01L 19/12; F16L 19/0206; F16L 19/07; G01D 11/24; G01F 15/14; G01F 15/10; H01R 29/00; G12B 11/02
USPC ......... 73/706, 708, 756, 715–717, 723–724, 73/753–754, 861
See application file for complete search history.

(56) References Cited

U.S. PATENT DOCUMENTS 4,672,932 A * 6/1987 Schmidt ................. F01M 11/03
                                                             123/196 A
8,042,401 B2 * 10/2011 Broden ............... G01L 19/0046
                                                             361/283.4

FOREIGN PATENT DOCUMENTS

WO    WO 98/09146    3/1998

OTHER PUBLICATIONS

Rosemount 3051 Pressure Transmitter, Product Data Sheet, Dec. 2013 (90 pages).

* cited by examiner

*Primary Examiner* — Harshad R Patel
*Assistant Examiner* — Brandi Hopkins
(74) *Attorney, Agent, or Firm* — Nixon & Vanderhye P.C.

(57) ABSTRACT

Pressure transmitters mounted on a panel are arranged so as to ease and facilitate their calibration. More particularly, curved tubing portions are interposed between the drain/vent valves and transmitter bases of the pressure transmitters so as to cause the drain/vent valves to face outwardly from the panel in the same direction that pressure valves on the transmitter base face. Common fluid lines together with a pressurization valve are provided to simultaneously pressurize multiple pressure transmitters to further ease the calibration process.

9 Claims, 5 Drawing Sheets

PRESSURE TRANSMITTER PANEL HAVING DRAIN/VENT VALVES ORIENTED TO FACE FORWARD

TECHNOLOGICAL FIELD

An array of pressure transmitters, used in protecting rotating machinery including gas turbines, are arranged on a panel so as to facilitate calibration and maintenance of the transmitters. More particularly, the drain/vent valves of the transmitters are oriented to face outwardly from the panel to provide easy access during the calibration or other processes and to limit the size of the panel. In addition, new valves on common fluid lines allow multiple transmitters to be pressurized at the same time thereby also speeding the calibration process.

BACKGROUND

Pressure transmitters such as the Rosemount 3051 series are used in protecting gas turbines and other rotating machinery. The pressure transmitters have multiple uses including: monitoring differential pressure across filters and strainers to prevent plugged filters from going undetected, thereby protecting the rotating equipment from debris and maintaining efficiency; measuring and maintaining lube oil pressure for preventing damage or failure of critical assets such as pumps, compressors, conveyors and other rotating assets; measuring and monitoring emissions flow to facilitate compliance with government regulations and automated reporting; and providing tank overspill protection.

Pressure transmitters may include several major components—the sensor assembly which includes an LCD display screen for displaying measured and monitored parameters, the manifold on which the sensor assembly sits, at least two opposed drain/vent valves which are threaded into the transmitter base and used in the calibration process, and two pressurization valves located on the manifold and also used in the calibration process. The input from a sensor to be monitored by the pressure transmitter is input to the connection port at the top of the sensor assembly.

As shown in FIG. 1, prior art pressure transmitters 12 mounted on a panel 10 have drain/vent valves 14 which oppose the drain/vent valves of adjacent pressure transmitters. The drain/vent valves 14 are oriented 90° from the face of the transmitter base 22. FIG. 2 shows that in conventional pressure transmitters the drain/vent valves 14 are threaded into the side of transmitter base 22 in opposite directions. Also shown in FIG. 1 are, respectively, high (H) and low (L) pressure lines led from independent pressure fluid source (not shown).

Drain/vent valves for pressure transmitters are well known in the prior art, and as used in the exemplary implementations described herein can be of any type and manufacture. One such drain/vent valve is disclosed in International Publication Number WO 98/09146. As noted above, the pressure transmitters described in the exemplary implementations herein described are the Rosemount 3051 series pressure transmitters, but as those skilled in the art would readily recognize other types and manufactures of pressure transmitters can also be used.

It is desirable to mount pressure transmitters arranged in an array on a panel for a bank of machinery such as, for example, gas turbines. Typically a panel can include ten or more pressure transmitters. Each pressure transmitter is typically oriented on the panel so that the High and Low manifold valves 16, 18 are facing to the front of the panel. However, as shown in FIGS. 1 and 2, the drain/vent valves 14 of the pressure transmitters 12 are threaded into the transmitter base 22 so that they are disposed at approximately a 90° angle. Accordingly, adjacent pressure transmitters 12 have drain/vent valves substantially facing each other. With this orientation, a rather large panel is required for mounting the pressure transmitters so that calibration tools, including connectors, meters, etc., can access the drain/vent valves. Even in large sized panels a pressure transmitter cannot be adjusted and/or calibrated without having to temporarily remove the adjacent transmitters from the panel. Space restrictions at the panel location can lead to less than ideal conditions for adjusting each transmitter, resulting in increased time and labor costs.

FIG. 6 shows a schematic representation of conventional pressure transmitters 12 arranged on a panel 60. Each pressure transmitter includes a high pressure valve 16 and a low pressure valve 18 which are used to calibrate the high pressure and low pressure sides of each pressure transmitter serially or one at a time. Of course, as noted above adjacent pressure transmitters must be removed and then reinstalled to the panel to complete the process of calibrating each pressure transmitter.

More particularly, for calibrating the first pressure transmitter 12(1A), low and high pressure valve 18 and 16 must first be closed. Then, the drain/vent valves (also called stinger ports) are removed from both sides of transmitter base 22. Thereafter field calibration/verification check equipment is connected to the low pressure side of transmitter 12(1A). At this point low pressure side calibration is performed. For the high pressure side the field calibration/verification check equipment is moved from the low pressure side to the high pressure side. Once connected to the high pressure side the calibration is performed. The calibration is performed by applying high and low pressure fluid through respective high 66 and low 68 pressure lines to the transmitter. After calibration, the calibration/verification check equipment is removed from the stinger ports and the drain/vent valves are reinstalled. Finally, the low and high manifold valves 16, 18 on transmitter base 22 are opened. This same sequence of steps is repeated for each of the pressure transmitters 12(1B) through 12(1N). This serial pressure calibration process is very time consuming and labor intensive, and must also be performed in conjunction with the calibration process performed through the drain/vent valves which requires removal of adjacent pressure transmitters.

SUMMARY

An exemplary pressure transmitter may include several major components—a sensor assembly which includes an LCD display screen for displaying measured and monitored parameters, the manifold on which the sensor assembly sits, at least two opposed drain/vent valves connected to the transmitter base and used in the calibration process, and two pressurization valves located on the manifold and also used in the calibration process. One exemplary implementation solving the above describe problem modifies the pressure transmitters to include an elbow shape valve which allows the drain/vent valves to be reoriented approximately 90° so that they also face outwardly, i.e., in parallel with the high and low pressure manifold valves of the pressure transmitters. This reorientation of the drain/vent valves provides easy access for calibration tools and also reduces the amount of space required for the panel mounting of the pressure transmitters. Since the drain/vent valves do not extend outwardly beyond the sensor assembly of the pressure transmitters little or no additional space is needed in front of the panel and there is easy access to the drain/vent valves from the front of the panel. This arrangement provides for a compact transmitter array yet facilitates the calibration process by allowing each pressure transmitter to be calibrated without removing an adjacent transmitter or having to work in overly restricted and cramped conditions.

The calibration process for the pressure transmitters includes an initial step of pressurizing each pressure transmitter through the aforementioned pressurization valves located on the manifold. Preferably, the pressurization fluid is air. Prior art panel arrangements involved calibrating each pressure transmitter serially. In another exemplary implementation, the initial pressurization step can be conducted simultaneously on multiple pressure transmitters by the provision of high and low pressure valves on high and low pressure fluid lines. More particularly, common fluid lines connecting, respectively, to high and low pressure sides of the pressure transmitters through respective high and low pressurization valves allows for the substantially simultaneous pressurization of multiply connected pressure transmitters.

These and other advantages and features will become more apparent from the following description taken in conjunction with the drawings.

DETAILED DESCRIPTION

Figure 1:
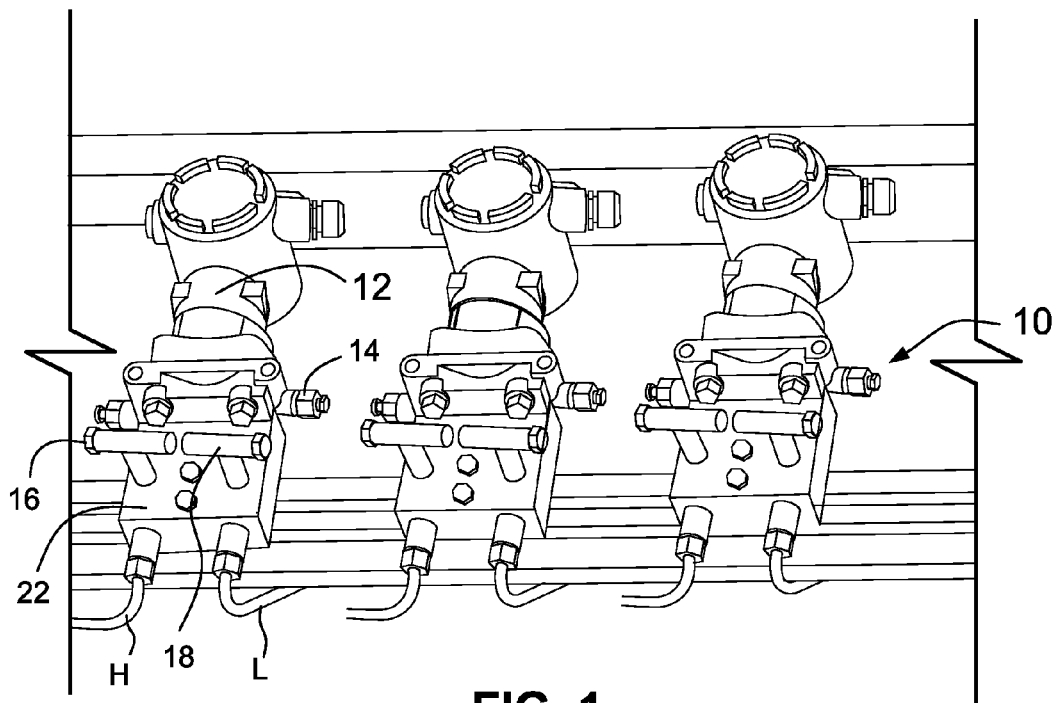
FIG. 1 shows a conventional pressure transmitter panel in which the drain/vent valves on adjacent transmitters face each other and are perpendicularly oriented to the sensor displays.
Figure 2:
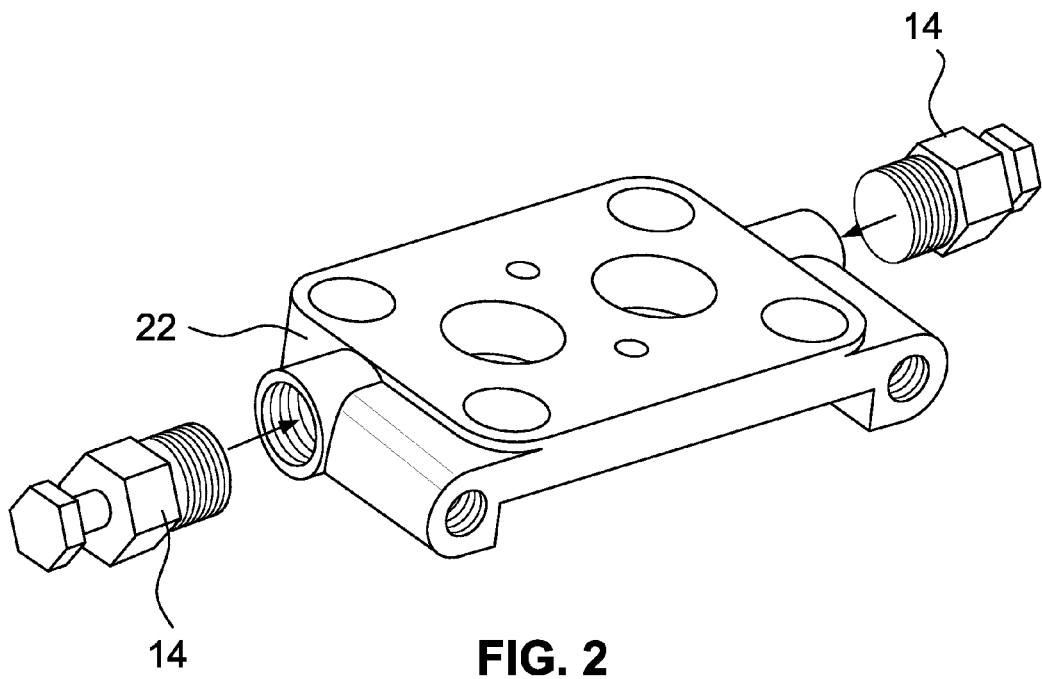
FIG. 2 shows the conventional arrangement of a drain/vent valve which is threaded into a port on the pressure transmitter manifold.
Figure 3:
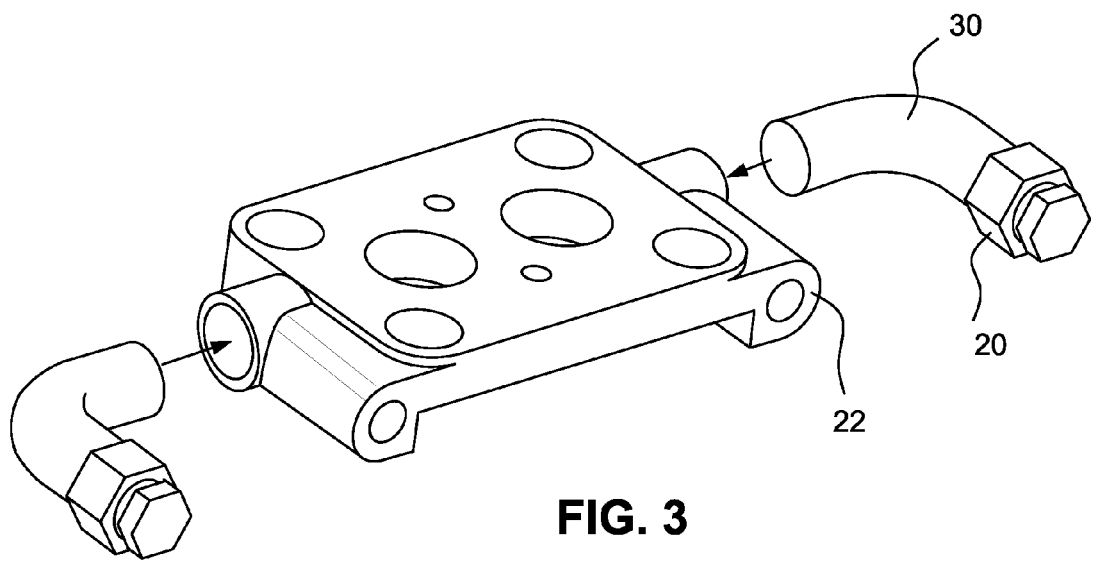
FIG. 3 shows a elbow shape connector integrally formed with the drain/vent valve and that connects with the pressure transmitter base.

FIG. 3 shows an exemplary implementation in which an elbow shaped portion 30 is integrally formed with drain/vent valve 20 at one end to form an elbow-shaped drain/vent valve 43, and the other end of elbow shaped portion 30 is connected to transmitter base 22. The elbow shaped portion 30 serves to redirect access to the drain/vent valves from the side of the pressure transmitter to the front of the panel on which the pressure transmitters are mounted. Since the drain/vent valves face outwardly from the panel by provision of the elbow shaped portion there is no interference from adjacent pressure transmitters during calibration of a particular pressure transmitter. With this reorientation of the drain/vent valves, drain/vent valves of adjacent pressure transmitters no longer face each other obviating the need to remove adjacent pressure transmitters during the calibration process of each pressure transmitter. Preferably the elbow shaped portion 30 comprises a 90° elbow fitting that makes at one end with the drain/vent valve and at its other end to the transmitter base.

While FIG. 3 shows elbow shaped portion 30 integrally formed with drain/vent valve 20 those skilled in the art will readily recognize that elbow shaped portion 30 and drain/vent valve 20 can be separate pieces that are assembled. The assembly of elbow shaped portion 30 and drain/vent valve 20 can be made by any suitable process including, for example, brazing, welding, soldering, etc.

Figure 4:
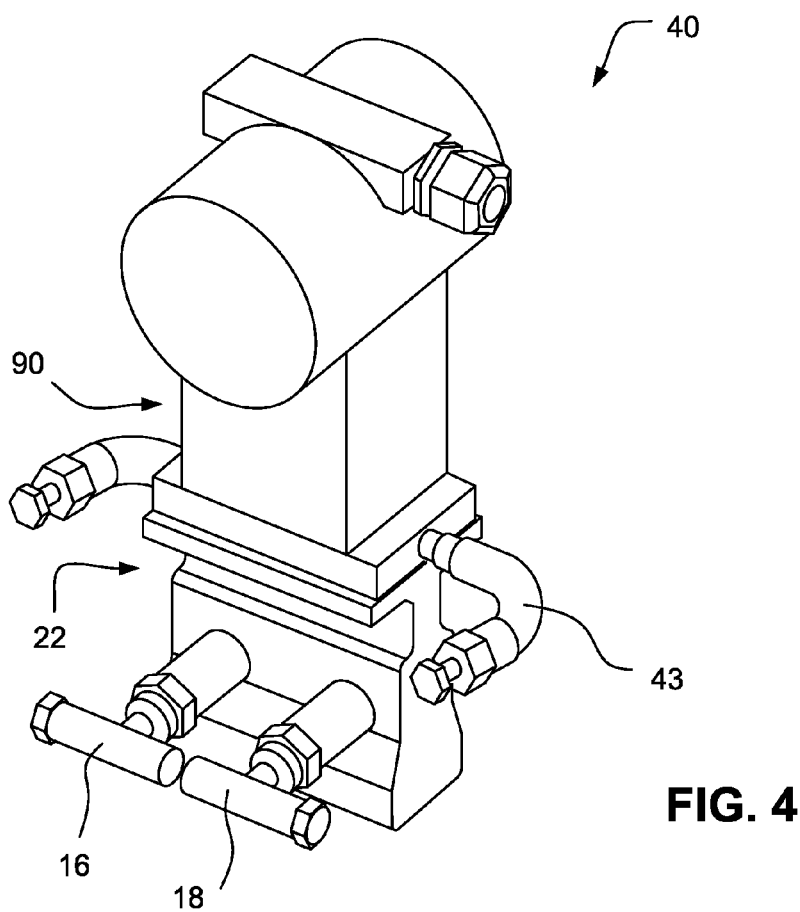
FIG. 4 shows an assembled pressure transmitter including a separate curved connector disposed between the drain/vent valve and manifold.

Also as shown in FIG. 4, the assembled pressure transmitter 40, including sensor assembly 90 and elbow shaped drain/vent valve 43 connected to transmitter base 22, allows for access to the drain/vent valves from the front of the pressure transmitter 40 which is the same direction from which the high and low pressure valves 16, 18 are oriented.

Figure 5:
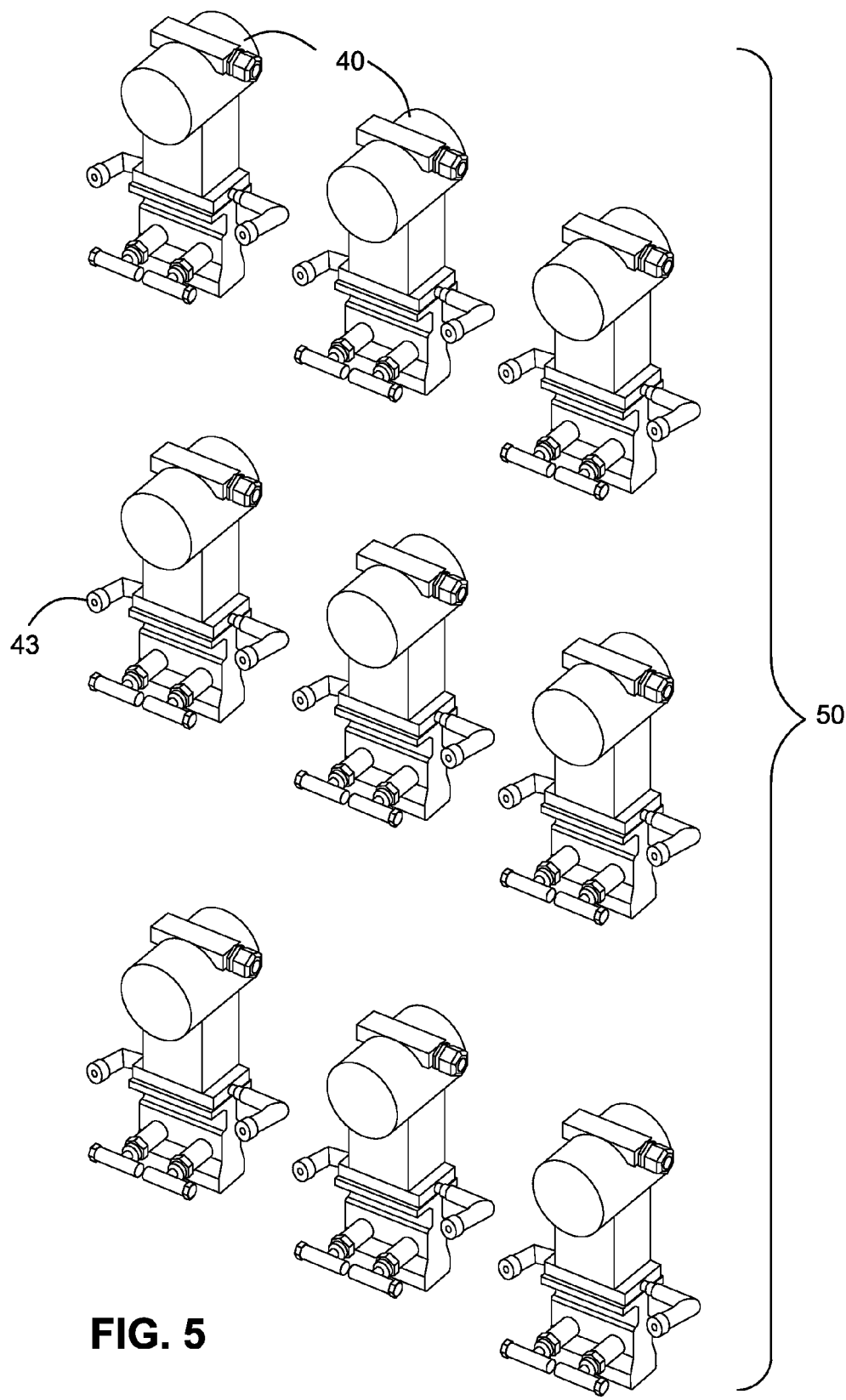
FIG. 5 shows a plurality of the pressure transmitters shown in FIG. 4 assembled into a panel.
Figure 6:
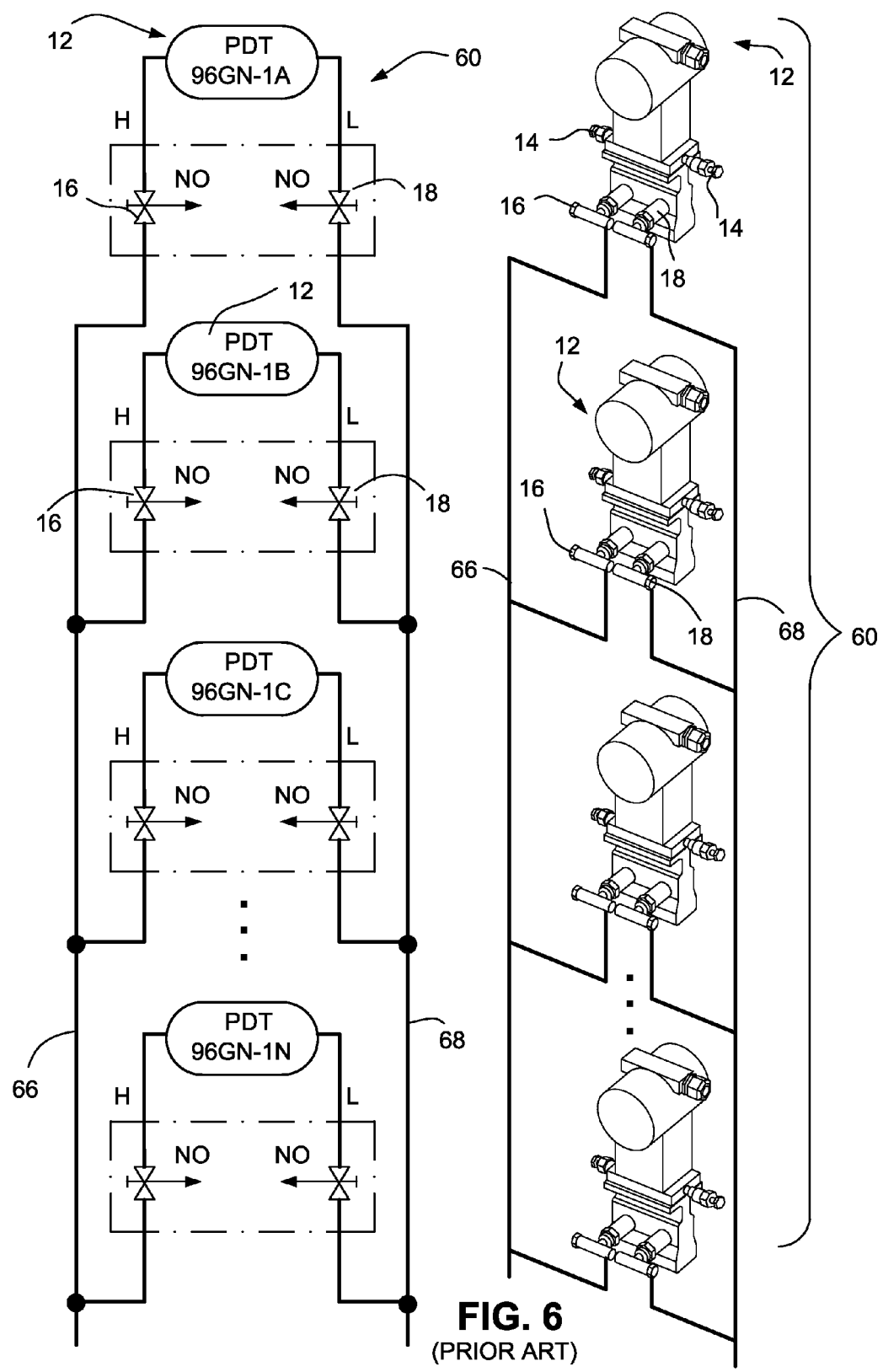
FIG. 6 shows a conventional pressure transmitter panel including fluid lines used in calibrating the pressure transmitters.

The configuration of panel 50 with the pressure transmitters 40, shown in FIG. 5, further facilitates calibration by allowing the calibration technician to easily apply the calibration tools to the forward facing elbow shaped drain/vent valves 43, for all pressure transmitters in the panel. This facilitates calibration of the pressure transmitters without the need to disassemble any part of the transmitter panel.

Figure 7:
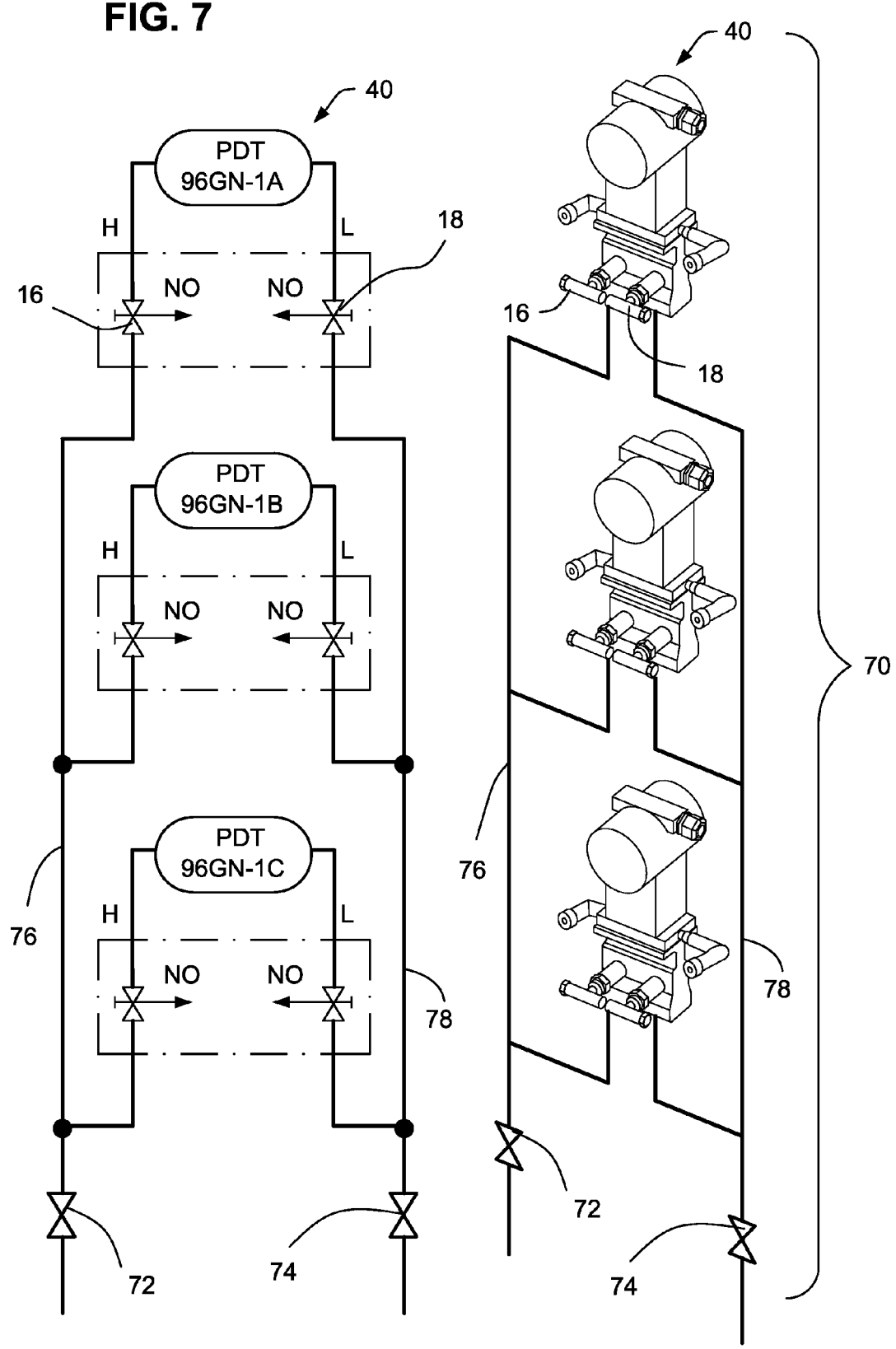
FIG. 7 shows an exemplary implementation of a pressure transmitter panel arranged for allowing the calibration of multiple pressure transmitters simultaneously.

FIG. 7 shows a schematic representation of another exemplary implementation for facilitating calibration of a panel 70 of pressure transmitters 40 in which three pressure transmitters 40 arranged in a vertical column of the panel are provided with common high side pressure valve 72 and common low side pressure valve 74. The calibration process commences by closing valves 72 and 74, respectively, applying high and low pressure fluid through high pressure line 76 and low pressure line 78. With this configuration, high pressure fluid can be simultaneously provided through common line 76 to the high pressure side of all three pressure transmitters 40 with high pressure valve 72, closed and each transmitter high pressure valve 16 in the normally open position. Thereafter the low pressure side of all three pressure transmitters 40 can be checked simultaneously by closing the common low pressure side valve 74 thereby applying fluid pressure to each pressure transmitter when individual low pressure valves 18 are in the normally open position.

Accordingly, calibration of the high pressure side of multiply connected pressure transmitters can be performed at the same time, and similarly calibration of the low pressure side of multiply connected pressure transmitters can also be performed at the same time. This example has been provided with three pressure transmitters linked together on their high and low pressure sides, but this is not meant to be limiting as less than or more than three pressure transmitters can be linked together in this way.

This written description uses example implementations of apparatuses to disclose the inventions, including the best mode, and also to enable any person skilled in the art to practice the inventions, including making and using the devices or systems. The patentable scope of the inventions is defined by the claims, and may include other examples that occur to those skilled in the art. Such other examples are intended to be within the scope of the claims if they have structural elements or process steps that do not differ from the literal language of the claims, or if they include equivalent structural elements or process steps with insubstantial differences from the literal language of the claims.

What is claimed is:

1. A pressure transmitter panel system comprising:
a panel;
a plurality of pressure transmitters mounted on the panel, each of said pressure transmitters having a sensor assembly disposed to face outwardly from the panel in a forward direction, a manifold on which the sensor assembly is interconnected, a transmitter base connected to the manifold, and at least one drain/vent valve fluidly connected to the sensor assembly through the transmitter base; and
an elbow-shaped fitting interposed between said at least one drain/vent valve and said transmitter base, wherein said elbow-shaped fitting serves to cause said at least one drain/vent valve to face outwardly from said panel in a forward direction.

2. The pressure transmitter panel system of claim 1, wherein said elbow-shaped fitting comprises a 90° elbow fitting.

3. The pressure transmitter panel of claim 1, wherein said at least one drain/vent valve and said elbow-shaped fitting are integrally formed.

4. The pressure transmitter panel system of claim 1, wherein at least one set of said respective sets of said plurality of pressure transmitters comprises at least two pressure transmitters.

5. The pressure transmitter panel system of claim 4, wherein each one of said pressure transmitters includes a high pressure valve and a low pressure valve which communicate with respective high pressure and low pressure portions of said sensor through said transmitter base and said manifold.

6. The pressure transmitter panel system of claim 5, wherein for at least one set of pressure transmitters the respective high pressure valves are interconnected by a first common fluid line and a pressurization valve and the respective low pressure valves are interconnected by a second common fluid line and a pressurization valve.

7. A pressure transmitter panel system comprising:
a panel;
a plurality of pressure transmitters mounted on the panel, each of said pressure transmitters having a sensor assembly disposed to face outwardly from the panel in a forward direction, a manifold on which the sensor assembly is interconnected, a transmitter base connected to the manifold, and at least one elbow shaped drain/vent valve fluidly connected to the sensor assembly through the transmitter base; and
wherein each of said at least one elbow shaped drain/vent valves face outwardly from said panel in a forward direction;
a plurality of common fluid lines interconnected to respective sets of said plurality of pressure transmitters; and
a plurality of pressurization valves each one of said plurality of pressurization valves being connected to one of said plurality of common fluid lines, wherein each one of said plurality of pressurization valves allows pressurized fluid to simultaneously flow to a respective set of interconnected pressure transmitters, wherein each elbow-shaped drain/vent valve includes an elbow-shaped fitting coupled to a respective transmitter base.

8. The pressure transmitter panel system of claim 7, wherein said at least one elbow shaped drain/vent valve includes a 90° elbow fitting.

9. The pressure transmitter panel system of claim 7, wherein said at least one elbow shape drain/vent valve and said 90° elbow fitting are integrally formed.

* * * * *

UNITED STATES PATENT AND TRADEMARK OFFICE
CERTIFICATE OF CORRECTION

| | | |
|---|---|---|
| PATENT NO. | : 9,759,627 B2 | Page 1 of 1 |
| APPLICATION NO. | : 14/576271 | |
| DATED | : September 12, 2017 | |
| INVENTOR(S) | : Martinez | |

It is certified that error appears in the above-identified patent and that said Letters Patent is hereby corrected as shown below:

In the Specification

Column 1, Line 50, change "led" to --fed--

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*